United States Patent
Marzahn

(10) Patent No.: US 7,301,256 B2
(45) Date of Patent: Nov. 27, 2007

(54) METHOD AND CIRCUIT CONFIGURATION FOR OPERATING A PIEZOELECTRIC ACTUATOR

(75) Inventor: Gabriel Marzahn, Lappersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 126 days.

(21) Appl. No.: 11/206,462

(22) Filed: Aug. 18, 2005

(65) Prior Publication Data

US 2006/0038463 A1 Feb. 23, 2006

(30) Foreign Application Priority Data

Aug. 18, 2004 (DE) .................. 10 2004 040 073

(51) Int. Cl.
*H01L 41/08* (2006.01)

(52) U.S. Cl. .................. 310/316.03; 310/317

(58) Field of Classification Search .......... 310/316.03, 310/317
See application file for complete search history.

(56) References Cited

U.S. PATENT DOCUMENTS

| | | | | |
|---|---|---|---|---|
| 5,204,576 A * | 4/1993 | Mitsuyasu | .................. | 310/317 |
| 5,986,360 A * | 11/1999 | Gerken et al. | .............. | 307/125 |
| 6,078,198 A * | 6/2000 | Gerken et al. | .............. | 327/111 |
| 6,081,061 A * | 6/2000 | Reineke et al. | ........ | 310/316.03 |
| 6,081,062 A * | 6/2000 | Hoffmann et al. | ..... | 310/316.03 |
| 6,121,715 A * | 9/2000 | Hoffmann et al. | ..... | 310/316.03 |
| 6,133,714 A * | 10/2000 | Hoffmann et al. | .......... | 320/166 |
| 6,137,208 A * | 10/2000 | Hoffmann et al. | ..... | 310/316.03 |
| 6,147,433 A | 11/2000 | Reineke et al. | | |
| 6,198,199 B1 * | 3/2001 | Hoffmann et al. | ..... | 310/316.03 |
| 6,333,585 B1 | 12/2001 | Hoffmann et al. | | |
| 6,384,512 B1 * | 5/2002 | Maeda | .................. | 310/316.03 |
| 6,441,535 B2 * | 8/2002 | Freudenberg et al. | .. | 310/316.03 |
| 6,522,049 B2 * | 2/2003 | Rueger | ...................... | 310/319 |
| 6,563,252 B2 * | 5/2003 | Schrod | .................. | 310/316.03 |
| 6,617,755 B2 * | 9/2003 | Kawamoto | ............. | 310/316.03 |
| 6,705,291 B2 * | 3/2004 | Rueger et al. | .............. | 123/467 |
| 6,982,516 B2 * | 1/2006 | Rueger et al. | ......... | 310/316.01 |
| 7,019,436 B2 * | 3/2006 | Rueger et al. | ......... | 310/316.03 |
| 2007/0103033 A1 * | 5/2007 | Martin | ....................... | 310/317 |

FOREIGN PATENT DOCUMENTS

| | | |
|---|---|---|
| DE | 197 09 717 C1 | 9/1998 |
| DE | 197 33 560 A1 | 2/1999 |

(Continued)

*Primary Examiner*—Thomas M. Dougherty
(74) *Attorney, Agent, or Firm*—Laurence A. Greenberg; Werner H. Stemer; Ralph E. Locher

(57) ABSTRACT

A piezoelectric actuator, for instance a piezoelement for driving an injection valve of an internal combustion engine, is discharged from a charge state, in which a first control potential is present on a first piezo-terminal and a second control potential is present on a second piezo-terminal. The discharging operation is accelerated by not only changing the potential prevailing on the first piezo-terminal toward the second control potential by way of a first discharge path, but a second discharge path is also formed between the second piezo-terminal and a potential lying between the two control potentials. By appropriate selection of the time sequence in connecting these two discharge paths and of their electrical properties, discontinuities in the discharge process can be almost completely avoided. The discharge process then proceeds very rapidly and evenly.

11 Claims, 5 Drawing Sheets

FOREIGN PATENT DOCUMENTS

| | | |
|---|---|---|
| DE | 198 43 621 A1 | 4/2000 |
| DE | 101 20 143 A1 | 10/2002 |
| DE | 102 28 146 A1 | 5/2004 |
| DE | 102 50 917 B3 | 6/2004 |
| JP | 4-166641 * 6/1992 | ................ 310/317 |
| WO | 04/001794 A2 | 12/2003 |

* cited by examiner

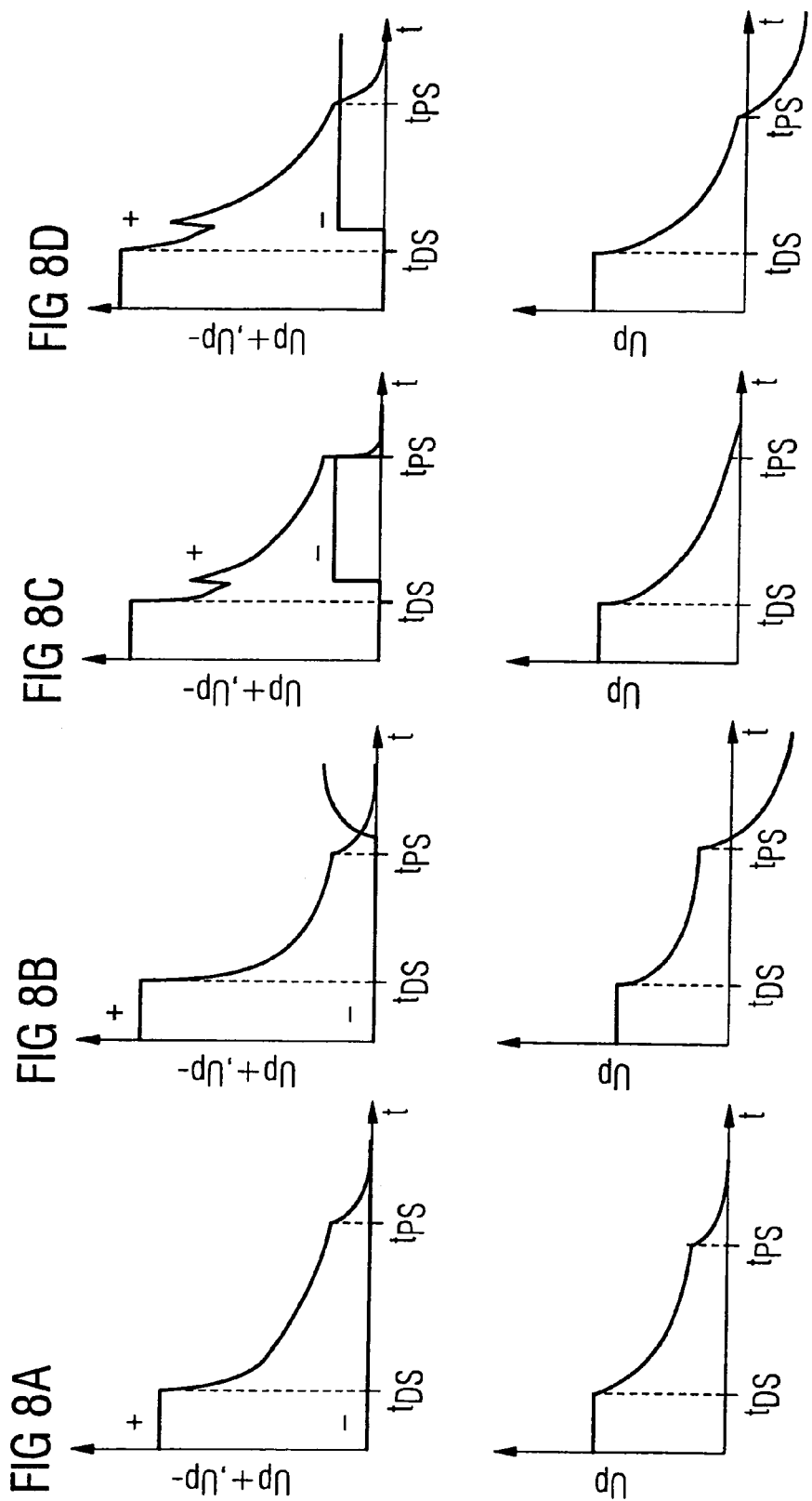

METHOD AND CIRCUIT CONFIGURATION FOR OPERATING A PIEZOELECTRIC ACTUATOR

BACKGROUND OF THE INVENTION

Field of the Invention

The invention relates to a method for operating a piezoelectric actuator, also referred to as a piezoactuator, in particular a piezoelectric actuator for activating a fuel injection valve of an internal combustion engine. The actuator has a first piezo-terminal and a second piezo-terminal for charging and discharging the piezoelectric actuator. At least one first discharge path is provided between the first piezo-terminal and a second control potential for the purpose of discharging the piezo-electric actuator, from a charge state of the piezoelectric actuator, in which a first control potential is present on the first piezo-terminal and the second control potential is present on the second piezo-terminal. The invention also relates to a circuit configuration for implementing such a method.

In particular, the emission standards for motor vehicles—which have become increasingly stringent in recent years—have triggered the development, in the automotive industry, of fuel injectors with rapidly and instantaneously responding actuators. Piezoelectric elements have proved particularly advantageous in the practical implementation of such actuators. Such piezoelements are normally assembled as a stack of piezoceramic disks, which are operated via a parallel electrical circuit in order to achieve the electrical field strengths necessary for sufficient stroke.

Methods as outlined above are known, for example, from U.S. Pat. No. 6,147,433 (cf. German published patent application DE 197 33 560 A1) and German published patent application DE 101 20 143 A1. The circuit configurations described therein are used for operating an injector configuration with one or more injectors, each of which is formed from an electrically controllable piezoelectric actuator and a fuel valve that can be actuated by way of the piezoelectric actuator. A control voltage for controlling the piezoelectric actuator is optionally routed to each of the injectors via a pair of leads.

The use of piezoelectric ceramic for activating fuel injection valves in an internal combustion engine places considerable demands on the electronics for charging and discharging the piezoceramic. Relatively high voltages (typically 100V or more) and, in the short term, relatively high currents (typically more than 10 A), must be provided for charging and discharging. In order to optimize the engine properties (e.g. emission levels, performance, fuel consumption etc.) these charging and discharge processes should be effected in fractions of milliseconds, with current and voltage being extensively controlled at the same time. The piezoceramic property of being a virtually completely capacitive load with only relatively low converted active power, yet with high reactive power on the other hand, requires more or less costly circuit designs for the electronics controlling the piezoelements.

In order to charge and discharge piezoelectric actuators, timed output stages are often used which feed the electrical power obtained from the piezoelectric actuator during discharging back to the power supply, for the purpose of improving the circuit efficiency. The problem with this, however, is that—as the discharge process becomes more advanced—the already reduced piezovoltage, after a certain instant, is no longer sufficient to drive the charge back into the output stage. Even if the two piezo-terminals are short-circuited, after a certain instant, via a discharge path or a limited-current path (e.g. a resistor), this produces a discontinuity in the form of a break in the piezovoltage curve at around the instant when a discharging switch is activated. This discontinuity in the voltage curve or the corresponding rapid change in the current flow can sometimes disrupt the functioning of the injector activated by the piezoelectric actuator.

SUMMARY OF THE INVENTION

It is accordingly an object of the invention to provide a method and a circuit for operating a piezoelectric actuator which overcome the above-mentioned disadvantages of the heretofore-known devices and methods of this general type and which further improve the operation of a piezoelectric actuator such that rapid discharging is made possible without disruptive discontinuities in the discharge process.

With the foregoing and other objects in view there is provided, in accordance with the invention, a method of operating a piezoelectric actuator, in particular a piezoactuator for a fuel injection valve of an internal combustion engine. The method comprises:

providing a piezoelectric actuator with a first piezo-terminal and a second piezo-terminal for charging and discharging the piezoelectric actuator;

providing at least one first discharge path between the first piezo-terminal and a second control potential for discharging the piezoelectric actuator from a charge state in which a first control potential is present on the first piezo-terminal and the second control potential is present on the second piezo-terminal; and connecting a second discharge path, at a defined instant during the discharging of the piezoelectric actuator, in between the second piezo-terminal and a potential lying between the first and second control potentials.

In other words, the invention provides (activates, connects) a second discharge path, at a certain instant during the discharging of the piezoelectric actuator, between the second piezo-terminal and a potential lying between the two control potentials. Such an "interim potential" can be generated relatively easily, e.g. from the control voltage, using circuit logic.

For example, in order to provide the second discharge path during the discharge process, a switch ("second discharge switch") can be closed in order to connect the second piezo-terminal to the potential lying between the two control potentials via a limited-current discharge path.

The basic concept underlying the invention is founded on the following knowledge: the process of discharging a piezoelectric actuator, from a charge state in which a first control potential is present on the first piezo-terminal and a second control potential is present on the second piezo-terminal, can be accelerated without causing disruptive discontinuities in the discharge process, whereby—during the discharge process—not only is the potential prevailing on the first piezo-terminal ("high side") changed toward the second control potential ("ground") by means of the first discharge path, but a second discharge path is also created between the second piezo-terminal and a potential lying between the two control potentials. By appropriate selection of the time sequence in the provision of these two discharge paths and of their electrical properties, discontinuities in the discharge process can be almost completely avoided. The discharge process then proceeds rapidly yet very evenly.

The second discharge path is preferably provided (e.g. by closing a second discharge switch) at an instant during the discharge process, at which the voltage between the two piezo-terminals is still at least 30% of the corresponding voltage in the charge state of the piezoelectric actuator. This measure ensures that the additionally created second discharge path can still have a significant effect, in the context of the total discharge process, for reducing the overall timespan required for discharging the piezoelectric actuator.

It is also beneficial if the potential lying between the two control potentials, to which the second piezo-terminal is connected via the second discharge path, has a maximum value of 50% of the first control potential in the charge state of the piezoelectric actuator. It has been found that selecting an interim potential in this range is useful for eliminating discontinuities in the discharge process almost completely.

Furthermore, this dimensioning of the interim potential has a further advantage for the construction of a more specific embodiment related to the electrical properties of the piezoelectric actuators being discussed in this context. If the second discharge path connecting the second piezo-terminal to the interim potential continues to be maintained after the piezoelectric actuator has been discharged (voltage between the piezo-terminals=0), then the polarity of the piezovoltage is reversed at the end of the discharge process. This polarity reversal is necessary for implementing an embodiment in which the stroke used in the piezoelectric actuator is increased by varying the control voltage, under normal operating conditions, across a range of control voltages, the limits of which have opposite polarities. In other words, the piezoceramic—in the transition from one extreme control status to the other extreme control status—is not extended (or shortened) merely from a dead state. Instead, the piezoceramic passes through the dead state during its transition between the extreme statuses.

Such an increase in useable stroke during the operation of a piezoelectric actuator for activating a fuel injection valve per se is known, for example, from DE 102 50 917 B3. This publication also shows that, by virtue of the physical characteristics of typically used piezoceramics, it is advantageous for the bias voltage (corresponding to the aforementioned interim potential) to be lower in terms of value than the maximum control voltage. Thus in this publication, an exemplary embodiment is described in which the piezoelectric actuator is operated with a maximum control voltage of +160V and a significantly lower bias voltage, in terms of value, of −30V. This selection of the control voltage range provides the advantage that the preferred polarity orientation of the piezoceramic is not reversed during operation (thus avoiding "hysteresis problems").

In accordance with a preferred embodiment, the second discharge path is deactivated again (e.g. the second discharge switch is reopened), at the earliest, at an instant at which the voltage present between the two piezo-terminals is already less than 5% of the corresponding voltage in the charge state of the piezoelectric actuator.

Selection of this instant guarantees that the second discharge path is effective for long enough to accelerate the discharge process perceptibly. In particular, if an idle state (piezovoltage=0) is to be achieved at the end of the discharge process, it is preferable for the second discharge path to be deactivated again approximately at an instant at which the piezovoltage is almost zero. If, on the other hand, the aforementioned polarity reversal of the piezovoltage is to be achieved with the discharge process, it is advantageous if the second discharge path is only deactivated again when the piezovoltage is already negative. The second discharge path then has a dual function, i.e. it accelerates or modifies the discharge process on the one hand, and reverses the polarity of the piezovoltage (increases stroke) on the other.

In a further embodiment, provision is made whereby at least one additional first discharge path is provided between the first piezo-terminal and the second control potential, during the discharge process and after the first discharge path has been provided, or after the discharge process. In principle, the discharge process can be further accelerated with one or more such additional first discharge paths. In practice, however, the arrangement in particular of a plurality of such additional first discharge paths or discharge switches is not usually feasible for reasons of cost.

However, the cost of providing one such additional discharge switch, with one additional first discharge path, is entirely justifiable in practice since such an additional discharge switch can be used to improve operating safety. In particular, if just one of the piezoelectric actuators has been discharged, at a certain instant, by a circuit configuration for operating a plurality of piezoelectric actuators, and if said piezoelectric actuator is to be reliably maintained in a dead state, this can easily be guaranteed by closing such an additional discharge switch ("safety switch"). If such a safety switch is already closed before the end of the discharge process, said discharge process can be accelerated slightly more as a result.

In particular, if such an additional first discharge switch is to have the aforementioned safety function, the additional discharge path it provides should have a high current carrying capacity and a relatively low electrical resistance ("safety short circuit"). However, there is a risk that closing this switch might cause a discontinuity in the discharge process. In order to minimize this discontinuity or its effects on the functioning of the overall system, it is preferable—according to one embodiment—if the additional first discharge path is provided, or the additional first discharge switch is closed, at the earliest, at the instant at which the piezovoltage is already less than 30% of the corresponding voltage in the charge state of the piezoelectric actuator.

A circuit configuration for implementing the operating method according to the invention may have the following devices, for example:

a power supply for providing a voltage, from which may be generated a first control potential and a second control potential, the differential of which represents a (maximum) control voltage to be applied to the piezoelectric actuator in order to set said piezoelectric actuator to a (maximum) charge state;

a first switching unit, which—depending on a first control signal—either applies the first control potential (for charging) or the second control potential (for discharging), to the first piezo-terminal;

a second switching unit, which—depending on a second control signal—applies the second control potential (during the charging process), or a potential lying between the two control potentials (during the discharge process), to the second piezo-terminal; and a control unit for providing the aforementioned control signals (e.g. as implemented in an engine control device).

Other features which are considered as characteristic for the invention are set forth in the appended claims.

Although the invention is illustrated and described herein as embodied in a method and circuit configuration for operating a piezoelectric actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 8A-8D are summary illustrations of various time characteristics during the discharging of a piezoelectric actuator that result from different modes of operation of the part of the circuit shown in FIG. 4.

DESCRIPTION OF THE PREFERRED EMBODIMENTS

Figure 1:
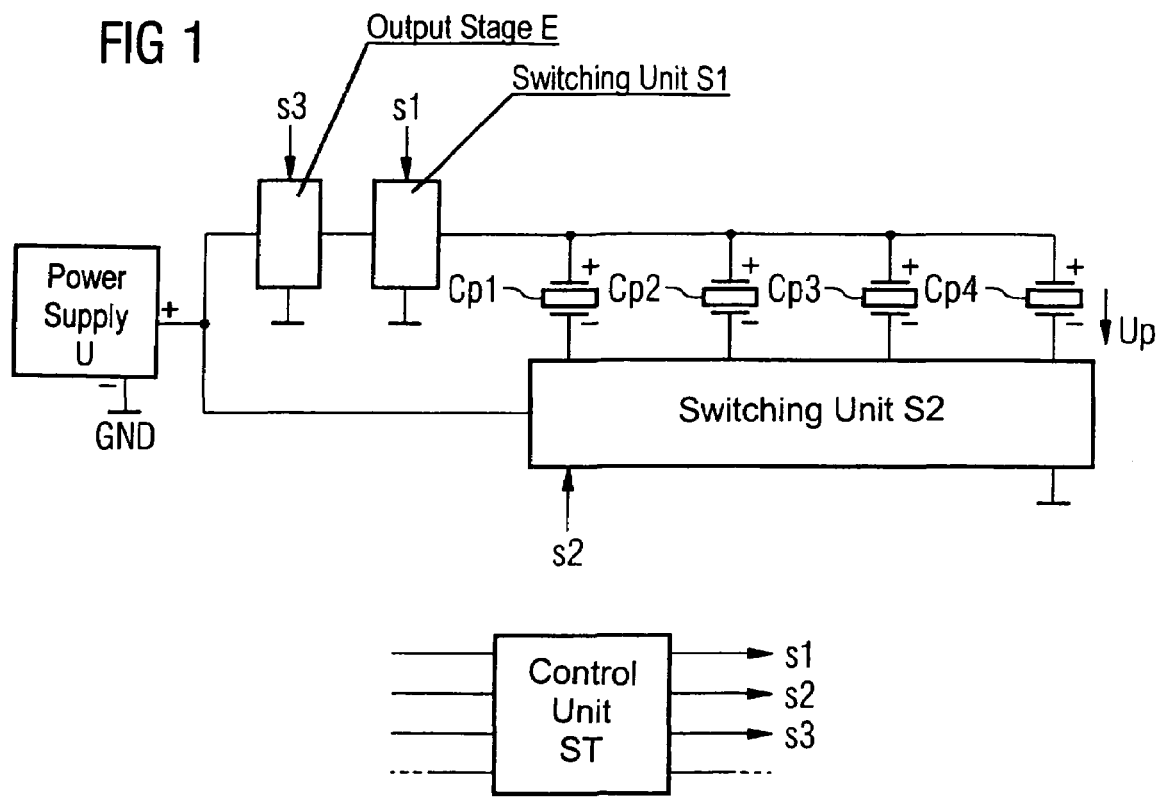
FIG. 1 is a schematic block diagram of a circuit configuration for operating a plurality of piezoelectric actuators.

Referring now to the figures of the drawing in detail and first, particularly, to FIG. 1 thereof, there is shown a block diagram of a circuit configuration for controlling four piezoelectric actuators, or piezoactuators, Cp1, Cp2, Cp3 and Cp4. One or all of these piezoelectric actuators are also referred to hereinafter by the abbreviation Cp. The piezoelectric actuators Cp are electrically connected to one another and to a first switching unit S1 via a first piezo-terminal Cp+ (positive pole). The piezoelectric actuators Cp are connected to a second switching unit S2 with a second piezo-terminal Cp−. The piezo-terminals may also be referred to as piezo-connections Cp+ and Cp−.

The piezoelectric actuators Cp are used for activating respective fuel injection valves of an internal combustion engine of a motor vehicle. Charging and discharging of the piezoelectric actuators Cp, as required for operation of the piezoelectric actuator configuration, is effected by providing (activating) and deactivating charge and discharge paths or passages via the two switching units S1 and S2.

The switching unit S1 applies a first piezopotential, in a controlled or regulated manner, to the first piezo-terminals, and is electrically connected to a power supply U via an output stage E. The second switching unit S2 is also connected to the power supply U and is used for applying a second piezopotential to the second piezo-terminals.

The differential between the control potentials present on a piezoelectric actuator Cp is also referred to below as piezovoltage Up.

During operation of the circuit configuration, the two switching units S1, S2 and the output stage E are controlled by a control unit ST, which emits control signals s1, s2 and s3 to the switching units S1, S2 and the output stage E for this purpose.

In a way that is known per se, the control signal 2 can cause the switching unit S2, for example, to connect the second piezo-terminal Cp− of a certain piezoelectric actuator Cp (to be charged subsequently) to the electrical vehicle ground GND (second control potential). This process is usually known as "selection" and is effected by closing a selection switch disposed between the relevant piezo-terminal Cp− and ground GND. The piezoelectric actuator Cp thus selected can then be charged by (continuous or timed) control of the output stage E and of the first switching unit S1 by means of the control signals s3 and s1, such that a predefined charge potential or a predefined charge potential sequence is generated by the output stage E for forwarding to the first piezo-terminal Cp+ via the first switching unit S1. The selected piezoelectric actuator Cp is thus brought to a charge state in which the piezovoltage Up, for example, may correspond to the voltage provided by the power supply U. However, this is by no means necessarily the case. The piezovoltage provided for the charge state may vary from it, depending on how the output stage is configured.

At this stage it should be noted that the circuits illustrated in FIG. 1 and in the subsequent diagrams are shown in greatly simplified form, to aid in the understanding of the invention, and that their construction is more complex in reality.

The charge potential or the predetermined charge potential sequence provided by the output stage E is usually forwarded, e.g. in timed output stages, to the first piezo-terminal Cp+ via an output filter (implemented in E and/or S1). This output filter comprises, for example, a capacitor (e.g. 1 µF) between "high side" and ground GND followed by (on the piezoelectric actuator Cp) an inductor (e.g. 10 µH) connected in series. In this way, which is known per se, a second-order low pass is produced, which smoothes the saw-tooth current. This output filter mainly delays the discharge process and increases the disruptive discontinuity in the discharge process.

In contrast, in the case of a "ring-around" or "LC" output stage, the charging of the piezoelectric actuator Cp is effected by the polarity of the charge being reversed by a ring-around capacitor (e.g. 10 µF) via a ring-around coil (e.g. 900 µH) into the piezo.

In a way that is likewise known per se, the piezoelectric actuator Cp can be discharged from the charge state, whereby a first discharge path, which connects the first piezo-terminal Cp+ (continuously or timed; usually via a current-limiting coil) to ground GND, is provided by means of or in the first switching unit S1.

In a ring-around output stage, the piezoelectric actuator Cp is discharged e.g. by the polarity of a charge being reversed by the aforementioned ring-around capacitor, via the aforementioned ring-around coil, from the piezo back toward the output stage.

Because the current carrying capacity of this discharge path is limited in practice, the discharge process requires a certain amount of time. In order to accelerate discharging, the provision of an additional first discharge path at a certain instant during the discharge process is to be considered.

Figure 2:
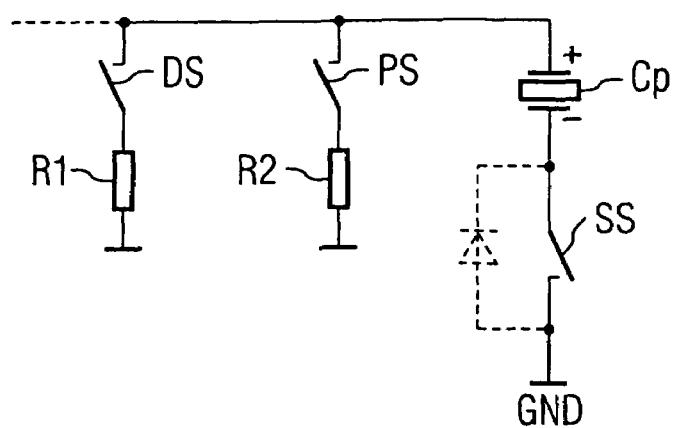
FIG. 2 is a block diagram illustrating the effect of first discharge paths during the discharging of a piezoelectric actuator.
Figure 3:
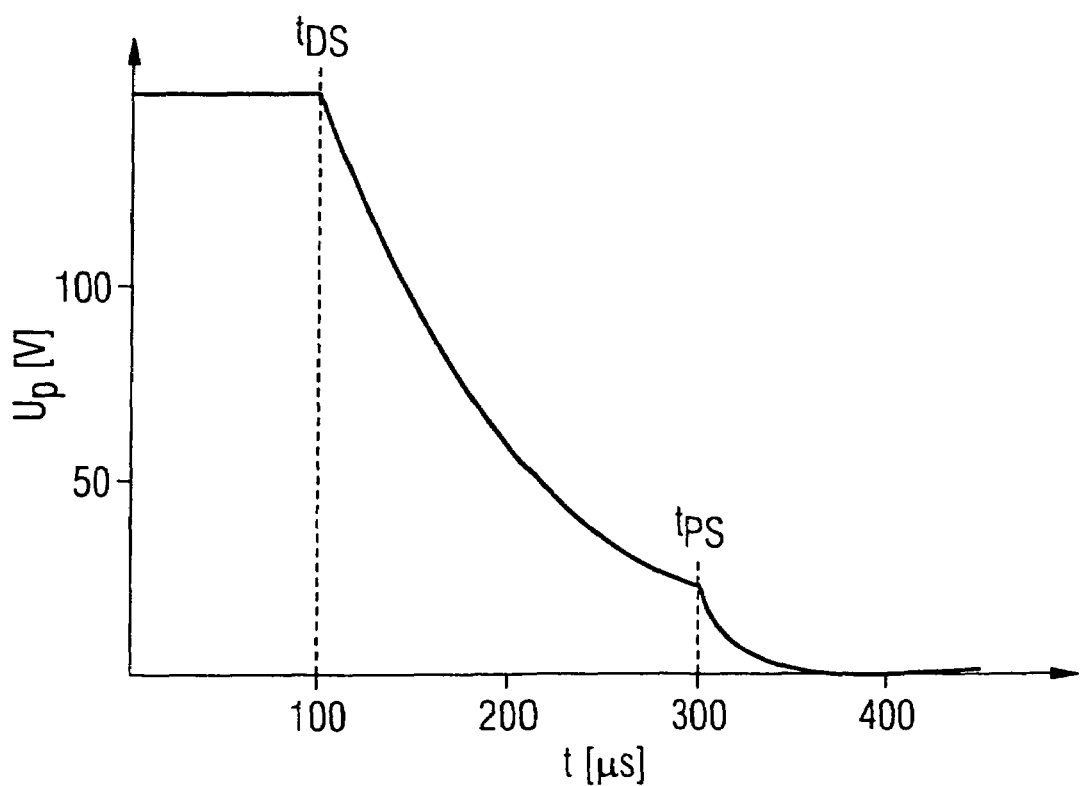
FIG. 3 is a diagram showing the time characteristic of the piezovoltage during a discharge process by way of the discharge paths as per FIG. 2.

The discharge process described so far is explained in greater detail on the basis of FIGS. 2 and 3.

FIG. 2 shows a selection switch SS and two first discharge switches DS and PS contained in the switching unit S2, said first discharge switches being contained in the first switching unit S1 or the output stage E respectively and serving to provide first discharge paths (symbolized here by resistors R1 and R2 for the sake of simplicity). In a ring-around output stage, ring-around capacitor and ring-around coil would usually be disposed between the switches DS und PS.

The switch SS represents a selection switched used for each of the piezoelectric actuators Cp, by means of which the output stage E can be used for a plurality of actuators. The diode in parallel to this switch, indicated by a dotted line, represents the substrate diode of this switch, whereby said switch is configured as a power field effect transistor.

Figure 5:
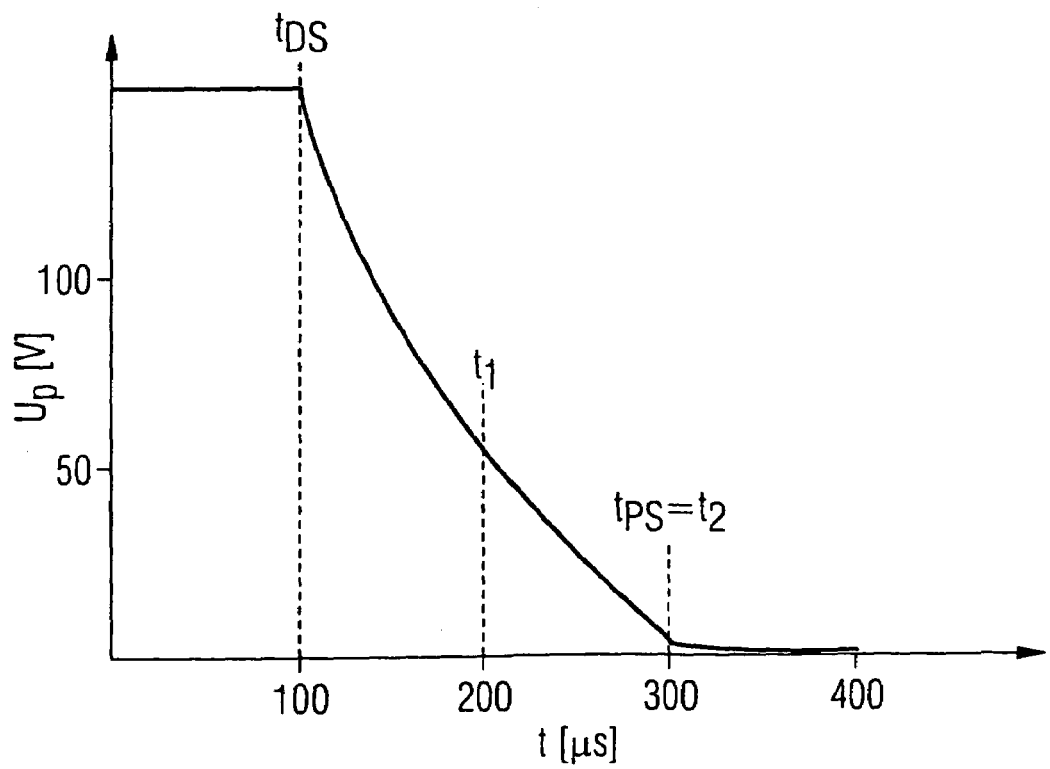
FIG. 5 is a diagram showing the time characteristic of the piezovoltage during a discharge process by means of the discharge paths as per FIG. 4.

Discharging via simple ohmic resistance, labeled here as R1 for the sake of simplicity, is—in reality—already unfavorable due to high power loss and poor efficiency. The discharge process via R1, which is considered here in greater detail, is intended merely to reflect the discharge process via a real driver. The charging process is actually effected, as mentioned above, for example by periodic application of a transformer coil ("flyback principle") or by reversing the polarity of the charge (LC driver). Accordingly, the time characteristic of the piezovoltage Up shown in FIGS. 3 and 5 is also only a more or less approximate model of the actual characteristic (which, for example, may have fine stages if timed).

Starting from a charge state on the piezoelectric actuator Cp, in which the selection switch SS is normally closed (but not necessarily so, due to the substrate diode), the discharge switch DS is closed first to discharge the piezoelectric actuator Cp, in order to connect the first piezo-terminal Cp+ to ground GND via the resistor R1.

FIG. 3 shows the time characteristic of the piezovoltage Up (modeled here in simplified form). This shows that a fall in the piezovoltage Up starts with the closing of the discharge switch DS at a certain instant (in this case: $t_{DS}=100$ μs).

If the additional discharge switch PS is also closed at a later stage during the discharge process (in this case: $t_{PS}=300$ μs), then the discharge process is accelerated thereafter. There is, however, a break in the piezovoltage curve, which is equivalent to a rapid increase in the total discharge current carried via the discharge paths. Such a discontinuity in the piezovoltage characteristic may in practice sometimes adversely affect the functioning of the fuel injectors.

This discontinuity in the discharge process may, however, be eliminated by a modification to the functioning of the second switching unit S2. This is explained below on the basis of FIGS. 4 and 5.

Figure 4:
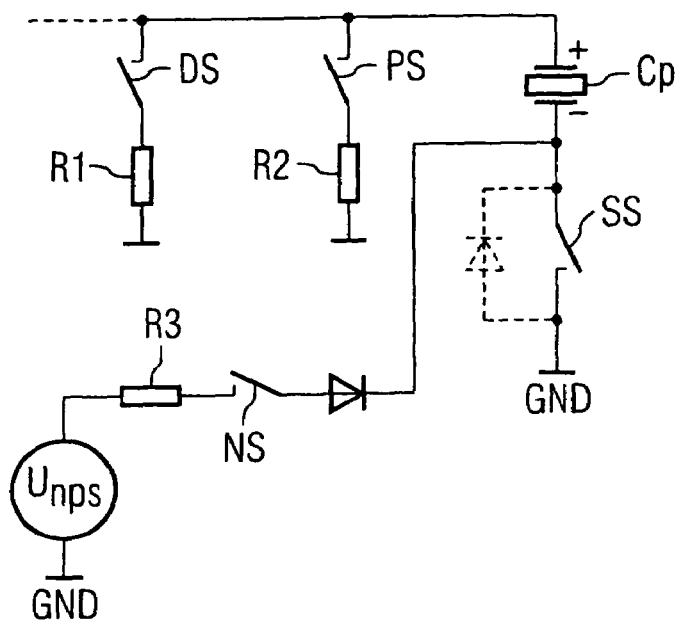
FIG. 4 is a block diagram illustrating the effect of first discharge paths and an additional second discharge path during the discharging of a piezoelectric actuator.

FIGS. 4 and 5, like FIGS. 2 and 3, show the parts of the circuit essential for the discharge process (FIG. 4) and a simplified model of the piezovoltage curve resulting during the discharge process (FIG. 5).

As in the discharge process described above, a discharge switch DS is again closed at an instant $t_{DS}=100$ μs and an additional discharge switch DS is closed at an instant $t_{PS}=300$ μs (cf. FIG. 5). However, the closing of the additional discharge switch PS does not lead to any adverse discontinuity in the discharge process, because the piezovoltage is already virtually zero at the corresponding instant $t_{PS}$ (in this case: 300 μs). This is effected in that, at a certain instant $t_1$ during the discharge process, a second discharge switch NS contained in the switching unit S2 (cf. FIG. 5) is closed in order to connect the second piezo-terminal Cp– to a potential $U_{nps}$ via a second discharge path (symbolized in FIG. 5 by a resistor R3), said potential being generated by the second switching unit S2 and lying between the two control potentials U and GND, which are routed to this switching unit. This means that the decreasing piezovoltage Up, as from the instant $t_1$, enters almost continuously into a further voltage curve, the increase in which levels off to a relatively small degree until the piezoelectric actuator Cp is fully discharged, so that the piezoelectric actuator Cp is already almost fully discharged at an instant t=300 μs. In the exemplary embodiment illustrated, it is precisely at this instant that both the additional first discharge switch PS is closed ($t_{PS}$) and the second discharge switch NS is reopened ($t_2$).

The diode visible between NS and SS or Cp– in FIG. 4 allows current to flow from $U_{nps}$ to the piezoelectric actuator Cp with NS closed, yet conversely prevents it from flowing back into $U_{nps}$. One such (isolating) diode, which isolates the different actuators in a so-called "bank", must be available for each piezoelectric actuator in said bank. Just as an output stage (high-side driver) can drive a plurality of injectors selected via the selection switch SS, a circuit module for providing the interim potential $U_{nps}$ can apply or reverse the polarity of a plurality of injectors that are isolated via these diodes (cf. FIG. 7). For this purpose a branch can be provided from one circuit module to a plurality of actuators between one existing switch NS and a corresponding plurality of diodes.

As a result, the discharge process is accelerated in comparison to the operating method as per FIGS. 3 and 4 without causing any significant discontinuity in the discharge process.

The selection switch SS must be opened at the same time that the second discharge switch NS is closed. However, this does not interrupt the discharge process since the discharge current is taken over from the second discharge path NS, R3, $U_{nps}$ as from this point. It should be noted in this connection that, as from this point, the discharge current can also partially flow via a diode disposed in parallel to the switch SS (indicated by a dotted line in FIGS. 2 and 4). This diode may be specifically provided for this purpose and/or—as mentioned above—implemented by a suitably designed selection switch SS (substrate diode of a FET).

Figure 6:
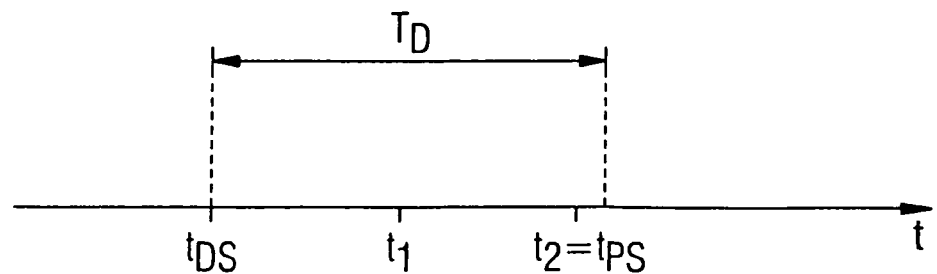
FIG. 6 is a diagram illustrating the timings in the provision of different discharge paths during the discharge process.

FIG. 6 again illustrates the time sequence of the instants at which activation/deactivation and switching take place during a discharge process, which requires an overall time duration $T_D$. The discharging of the Cp starts with the closing of the first discharge switch DS at an instant $t_{DS}$. The second discharge switch NS is then closed during this discharge phase at an instant $t_1=200$ μs. Only when the piezovoltage Up has fallen virtually to zero is the second discharge switch NS reopened and the additional first discharge switch PS closed. The switch PS can remain closed for safety reasons until the corresponding piezoelectric actuator Cp (or another piezoelectric actuator in the same bank) is selected again for charging at a later stage.

By way of variation from this exemplary embodiment, it is possible—by additional switching of the second discharge path during the discharge process—to dispense with the additional first discharge switch PS. This additional switch PS can therefore be omitted entirely to reduce the costs of the circuit configuration.

In the embodiment described on the basis of FIGS. 4 and 5, the second discharge switch NS is reopened at an instant $t_2$ at which the piezovoltage Up is almost zero. A modification of the operating process, in which the second discharge switch NS remains closed beyond the dead status of Up=0, is explained below on the basis of FIG. 7.

Figure 7:
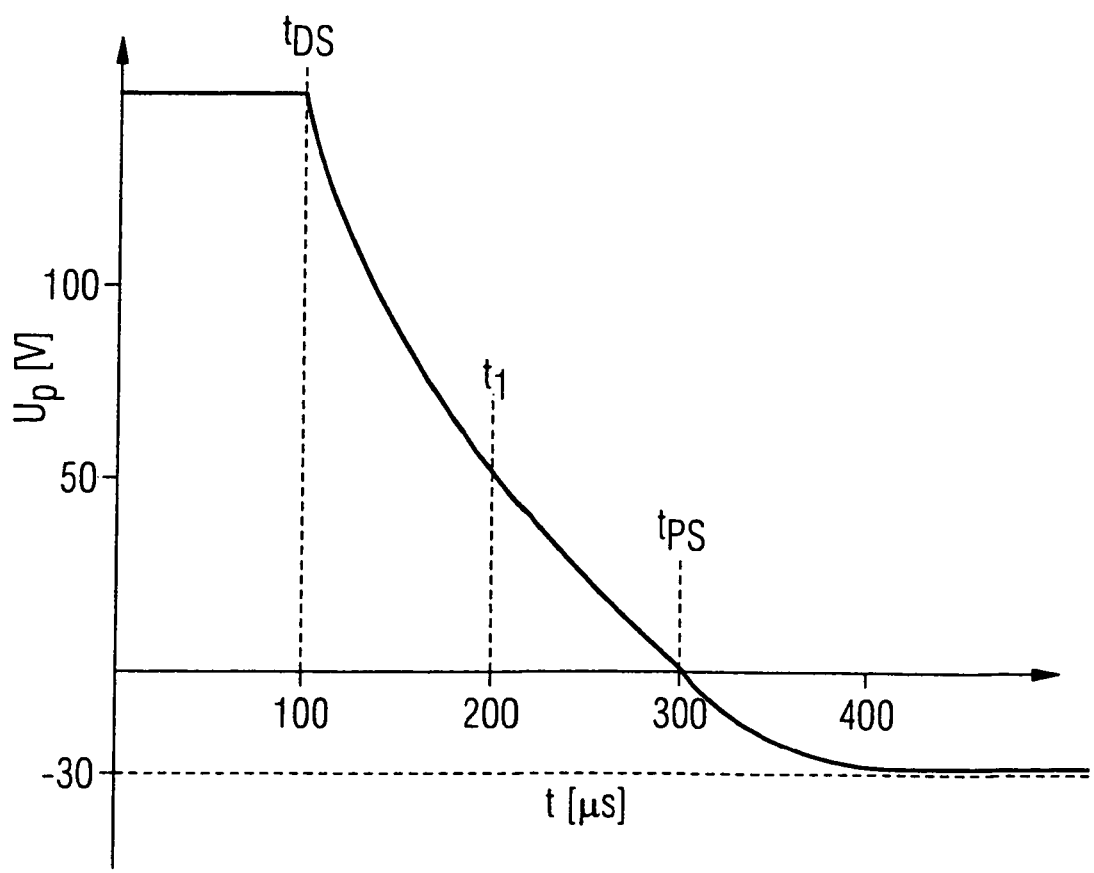
FIG. 7 is an illustration, similar to FIG. 5, of the time characteristic, that results from modified operation of the part of the circuit shown in FIG. 4.

FIG. 7 shows the time characteristic of the piezovoltage Up for the case in which the switching instants $t_{DS}$, $t_1$ and $t_{PS}$ are again selected as t=100 μs, 200 μs and 300 μs, however the second discharge switch NS is not reopened at around the instant $t_{PS}$ but remains closed beyond this instant and is only reopened immediately before a piezoelectric actuator Cp from the same bank is selected for another charge process. Discontinuities in the discharge process are again avoided as a result. In addition, the polarity of the piezovoltage Up is reversed at around t=300 μs, whereby a second control potential (in this case: +30V) is applied to the second piezo-terminal Cp–, said second control potential being positive compared to the first control potential, which has already fallen greatly (to approx GND=0V). In this way the discharge process is extended slightly (up to about t=400 μs) beyond the dead status Up=0, thereby achieving, however, the advantage already mentioned above of increased stroke in the controlled piezoelectric actuator Cp.

After the Cp has been discharged into negative and before the next actuator in the same bank is charged, the switch NS is opened as appropriate (but not necessarily, depending on the configuration of the passage labeled R3). $U_{nps}$ would be loaded by a short circuit through the corresponding conductive selection switch SS. All actuators lose their negative voltage only very slowly, since no discharge path is available other than—for example—a parallel shunt (e.g. 200 kOhm) normally integrated in the piezoelectric actuators. The piezoelectric actuator to be charged next is then selected and is thus discharged to 0V abruptly, since the discharge switch PS is still conductive at this instant. The switch PS is then opened and the piezoelectric actuator charged to—for example—150V. The other piezoelectric actuators in this bank that are not selected conform to this voltage swing on both their positive pole (Cp+) and their negative pole (Cp–), with Cp– having a higher potential, around $U_{nps}$, than Cp+. To prevent the negative poles of the non-selected piezoelectric actuators Cp, said negative poles having high potential at this instant, from being short-circuited to 0V by the negative pole of the selected actuator via the shared connection leading to the $U_{nps}$ power supply, it is advisable for such isolating diodes to be configured.

FIG. 8 is a summary illustration of the time characteristics of the two piezopotentials Up+ and Up– (FIG. 8 top) and the resulting piezovoltage Up=Up+–Up– (FIG. 8 bottom). These time characteristics are shown for different discharge operations of the circuit configuration according to FIG. 1, which are labeled a, b, c, and d in FIG. 8.

In case a, the second piezopotential Up– is maintained continuously at ground GND (selection switch SS closed). The first piezopotential Up+, on the other hand, is reduced by successive closing of the discharge switches DS and PS. This results in two discontinuities in the piezovoltage curve Up. This corresponds to the illustration in FIG. 3.

In case b, unlike in case a, the second discharge switch NS is closed again (and the selection switch SS is opened) after the additional discharge switch PS is closed, in order to bring the second piezo-terminal to a positive potential compared to the first piezo-terminal Cp+. As may be seen from the characteristic of the piezovoltage Up, the result is a wider range in piezovoltage variation and, consequently, a greater useable stroke in the piezoelectric actuator. The drawback, however, is that the two discharge discontinuities still occur in the piezovoltage characteristic Up.

Such problematic discontinuities in the discharge process are avoided in the cases c and d.

In the case c, by way of comparison, the second discharge switch NS is already closed at an early stage during the discharge process, i.e. shortly after the first discharge switch DS is closed. Only after the piezovoltage Up has almost reached the zero value is the other first discharge switch also closed and the second discharge switch NS reopened. This case corresponds to the illustration according to FIG. 5.

In the case d, unlike in case c, although the additional first discharge switch PS is closed when a piezovoltage Up is almost zero, the second discharge switch NS is however kept closed beyond this instant. This likewise results in significant discontinuities in the discharge process being avoided, while at the same time it increases stroke. This case corresponds to the illustration in FIG. 7.

To summarize, the process of discharging the piezo to the dead status Up=0 is accelerated in cases c and d by raising the second piezopotential Cp–. In the discharge processes disclosed to date, on the other hand, the second piezopotential ("low side") has been maintained at ground (GND or 0V).

As in the previous discharge processes, the potential of the first piezo-terminal Cp+ ("high side") is reduced—during discharging from a retention voltage in the charge state—whether by a timed or continuous power draw.

This application claims the priority, under 35 U.S.C. § 119, of German patent application No. 10 2004 040 073.3, filed Aug. 18, 2004; the entire disclosure of the prior application is herewith incorporated by reference.

I claim:

1. A method of operating a piezoelectric actuator, the method which comprises:
   providing a piezoelectric actuator with a first piezo-terminal and a second piezo-terminal for charging and discharging the piezoelectric actuator;
   charging the piezoelectric actuator by raising a voltage of the first piezo-terminal substantially to a first control potential and connecting the second piezo-terminal to a second control potential below the first control potential;
   discharging the piezoelectric actuator from a charge state in which the first control potential is present on the first piezo-terminal and the second control potential is present on the second piezo-terminal by connecting at least one first discharge path from the first piezo-terminal to the second control potential; and
   smoothing a discharge behavior of the piezoelectric actuator by connecting a second discharge path, at a defined instant during the discharging of the piezoelectric actuator, from the second piezo-terminal to a terminal having a potential between the first and second control potentials.

2. The method according to claim 1, which comprises driving the piezoelectric actuator for operating a fuel injection valve of an internal combustion engine.

3. The method according to claim 1, which comprises connecting the second discharge path at an instant during the discharging of the piezoelectric actuator at which the voltage between the first and second piezo-terminals is still at least 30% of the voltage in the charge state of the piezoelectric actuator.

4. The method according to claim 1, wherein the potential lying between the first and second control potentials has a maximum value of 50% of the first control potential in the charge state of the piezoelectric actuator.

5. The method according to claim 1, which comprises deactivating the second discharge path no earlier than at an instant at which the voltage present between the first and second piezo-terminals is already less than 5% of the voltage in the charge state of the piezoelectric actuator.

6. The method according to claim 5, which comprises deactivating the second discharge path at an instant at which the voltage present between the first and second piezo-terminals is almost zero.

7. The method according to claim 5, which comprises deactivating the second discharge path at an instant at which the voltage present between the first and second piezo-terminals has become negative.

8. The method according to claim 1, which comprises, subsequently to connecting the first discharge path, connecting at least one additional first discharge path between the first piezo-terminal and the second control potential, during the discharge process or after the discharge process.

9. The method according to claim 8, which comprises connecting the additional first discharge path no earlier than at an instant at which the voltage between the first and second piezo-terminals is already less than 30% of the corresponding voltage in the charge state of the piezoelectric actuator.

10. A circuit configuration for operating a piezoelectric actuator, which comprises a plurality of interconnected elements configured and controlled for implementing the method according to claim 1.

11. In combination with a motor vehicle, a circuit for operating a plurality of fuel injection valves of an internal combustion engine of the motor vehicle, the circuit comprising means for driving a plurality of piezoelectric actuators with the method according to claim 1.

* * * * *